Oct. 3, 1967 M. BELLENGER 3,345,634

RADIO INTERFEROMETER

Filed June 11, 1964 3 Sheets-Sheet 2

Oct. 3, 1967 M. BELLENGER 3,345,634

RADIO INTERFEROMETER

Filed June 11, 1964 3 Sheets-Sheet 3

United States Patent Office 3,345,634

Patented Oct. 3, 1967

3,345,634

RADIO INTERFEROMETER

Michel Bellenger, Paris, France, assignor to CSF—Compagnie Generale de Telegraphie Sans Fil, a corporation of France Filed June 11, 1964, Ser. No. 374,531
Claims priority, application France, June 19, 1963, 938,587
5 Claims. (Cl. 343—113)

The present invention relates to radio interferometers.

Radio interferometer systems generally comprise antennas spaced apart by a distance called base and equal to a few wavelengths of the incoming signal. The antennas are respectively coupled to phase measurement devices for determining the relative phase shift between the signals received by each antenna. The knowledge of this phase shift enables to determine the direction of a source, which is, for example, a space vehicle.

Generally, the source concerned is extremely remote and the signal-to-noise ratio is small, thus setting a limit to the system sensitivity.

To increase sensitivity, phase correlation is generally used which necessitates the use of a third antenna. The latter is interposed halfway between the two antennas, to give a third signal whose phase is taken as a reference.

However, under certain conditions, it is not possible to use a third antenna, for example for technological reasons.

It is an object of this invention to provide a two antenna radio interferometer system. According to the invention, local means are provided to produce a third signal, whose phase is controlled to be at any instant equal to the average of the phases of the signals respectively picked up by the two antennas.

The invention will be better understood from the following specification and appended drawings wherein.

Figure 1:
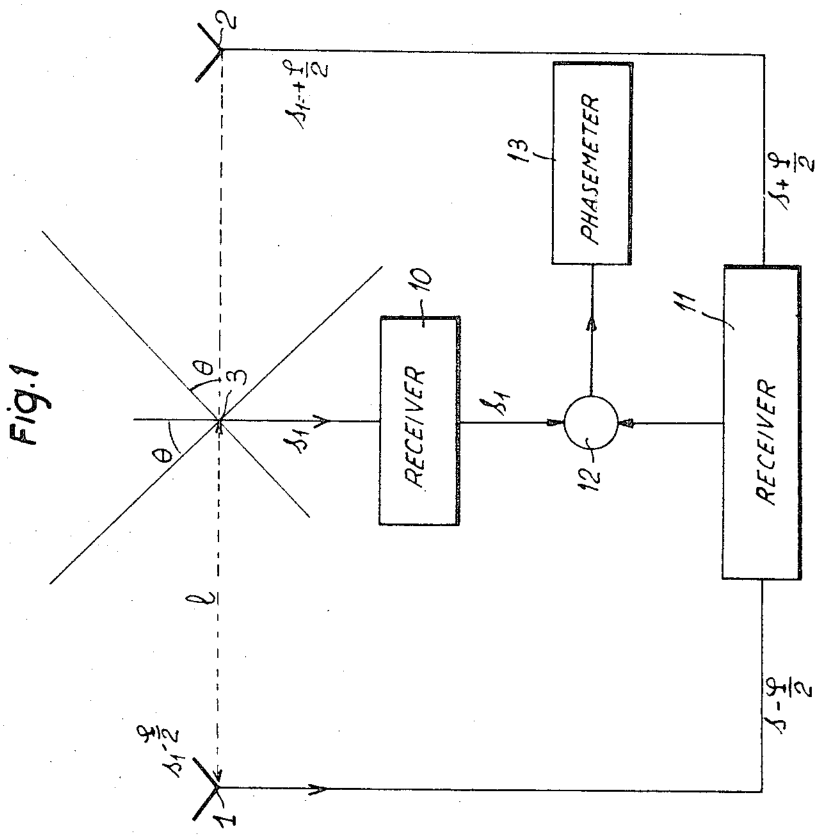
FIG. 1 is a block diagram showing the operating principle of a conventional interferometer.

In FIG. 1, two antennas 1 and 2 are separated by a base whose length will be designated by $2l$. Half way between antennas 1 and 2, i.e. at a distance $l$ from each antenna, is placed a third antenna 3.

Antennas 1, 2 and 3 receive from a distance source a signal which is, for example, a pure sinusoidal wave. The direction of the incoming signal makes an angle $\theta$ with the base.

If the phase of a signal, as picked up by the antenna 3, is taken as a zero phase, the phases of the signal received by antennas 1 and 2 will be respectively $$-\frac{\varphi}{2} \text{ and } +\frac{\varphi}{2}$$

with $$\varphi = \frac{4\pi \cos\theta}{\lambda}$$

$\lambda$ being the operating wavelength.

Signals $$s\diagdown\!\!\!\diagup -\frac{\varphi}{2} \text{ and } s\diagdown\!\!\!\diagup +\frac{\varphi}{2}$$

from antennas 1 and 2 respectively will be passed to a receiver 11 which, in a known manner, will provide an amplified signal including the information $\varphi$. The notion $s\diagdown\!\!\!\diagup\varphi$ is used to designate a signal $s$ having a phase $\varphi$ with respect to a reference signal whose phase is taken to be zero.

A receiver 10 is coupled to antenna 3 through a very narrow band pass phase-lock filter. A synchronous detector 12 detects a low-frequency signal carrying the phase information $\varphi$.

Such an arrangement performs a linear detection with a low signal-to-noise ratio threshold, i.e. for $$\frac{S}{B} \ll 1 \text{ or } \frac{S}{B} \ll 0 \text{ db}$$

S being the signal and B the noise.

As a matter of fact, the signal from antenna 3 can be considered as a carrier having two sidebands $$s\diagdown\!\!\!\diagup -\frac{\varphi}{2} \text{ and } s\diagdown\!\!\!\diagup +\frac{\varphi}{2}$$

The above procedure makes the use of a third antenna 3 necessary. However, under certain conditions, it may happen, that it is not physically possible to have a third antenna mounted between the two other antennas, for example, due to a lack of available room.

It is an object of this invention to achieve the same result without using a third antenna.

The invention consists in controlling an oscillator in such a manner as to have constantly the same phase shift $\varphi/2$ with respect to signals $s_1$ and $s_2$ which are shifted with respect to each other by $\varphi$, such that:

$$s = s_1\diagdown\!\!\!\diagup -\frac{\varphi}{2} = s_2\diagdown\!\!\!\diagup +\frac{\varphi}{2}$$

Figure 2:
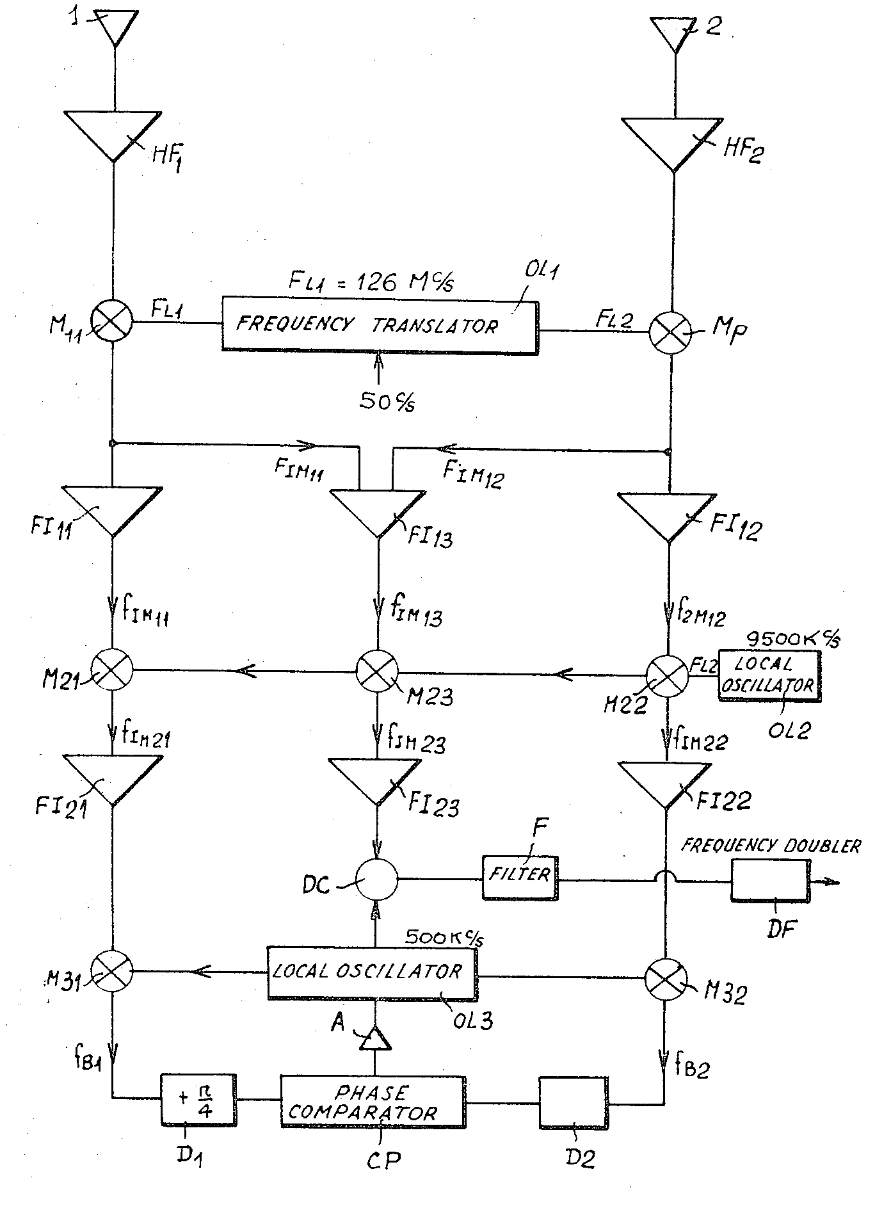
FIG. 2 is one embodiment of the invention.

A first embodiment of the invention is shown in FIG. 2.

By way of example, it will be assumed that $s$ is a sinusoidal wave with a frequency equal to 136 mc./s.

The system comprises two identical channels connected respectively to antennas 1 and 2. Antenna 1 feeds an amplifier $HF_1$ and antenna 2 an amplifier $HF_2$. Mixers $M_{11}$ and $M_{12}$ are respectively coupled to amplifiers $HF_1$ and $HF_2$. They are also coupled to a single side band suppressed carried frequency generator $OL_1$ designated hereinafter as a "frequency translator."

This system receives a signal $s_0$ at a frequency of 50 c./s. and provides signals $$F_{L12} = 126 \text{ mc./s.} - 50 \text{ c./s.}$$
$$F_{L11} = 126 \text{ mc./s.} + 50 \text{ c./s.}$$

Mixers $M_{11}$ and $M_{12}$ provide thus at their respective outputs signals of respective frequencies:

$$F_{IM_{11}} = 10 \text{ mc./s.} - 50 \text{ c./s.}\diagdown\!\!\!\diagup -\frac{\varphi}{2}$$

$$F_{IM_{12}} = 10 \text{ mc./s.} + 50 \text{ c./s.}\diagdown\!\!\!\diagup +\frac{\varphi}{2}$$

$\varphi$ being the phase shift between signals $s_1$ and $s_2$.

Figure 3:
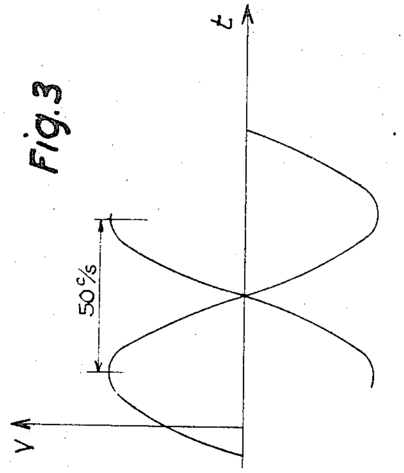
FIGS. 3 and 4 are explanatory graphs.

Both signals are fed to an amplifier $FI_{13}$, having as output signal $f_{IM_{13}}$, shown in FIG. 3 This signal is at a frequency of 10 mc./s. and is modulated at 50 c./s. with phase $\varphi/2$ with respect to signal $s_0$. This signal is passed to a mixer $M_{23}$.

Signals $F_{IM_{11}}$ and $F_{IM_{12}}$ are respectively fed to two further amplifiers $FI_{11}$ and $FI_{12}$, which pass them to mixers $M_{21}$ and $M_{22}$, after amplification.

A second local oscillator $OL_2$, delivers to mixers $M_{21}$, $M_{22}$ and $M_{23}$ a signal having a predetermined phase at a frequency of 9500 kc./s=$F_{12}$.

Mixers $M_{21}$ and $M_{22}$ put out intermediate frequencies signals having respective frequencies.

$$f_{IM_{21}}: 500 \text{ kc./s.} - 50 \text{ c./s.}\diagdown\!\!\!\diagup +\varphi/2$$

and $$f_{IM_{22}}: 500 \text{ kc./s.} - 50 \text{ c./s.}\diagdown\!\!\!\diagup +\varphi/2$$

which signals are amplified by amplifiers $FI_{21}$ and $FI_{22}$.

Amplifiers $F_{21}$ and $F_{22}$ are respectively followed by mixers $M_{31}$ and $M_{32}$ fed by an oscillator OL3, whose frequency is 500 kc./s. and whose phase is controlled by phase comparator CP, through an amplifier A.

Output signal from mixers $M_{31}$ and $M_{32}$ are phase-shifted, by $$\frac{\pi}{4} \text{ and} -\frac{\pi}{4}$$

respectively, by phase shifters $D_1$ and $D_2$ and are respectively applied to the inputs of comparator CP.

The system of FIG. 2 operates as follows:

Mixers $M_{31}$ and $M_{32}$ provide signals whose respective frequencies are:

$$f_{B1}\text{:50 c./s.} \vee +\frac{\varphi}{2}$$

$$f_{B2}\text{:50 c./s.} \vee +\frac{\varphi}{2}$$

As long as the phase shift provided by phase shifters $D_1$ and $D_2$ is maintained, the phase of oscillator OL3 is $\varphi=0$, that is to say equal the average of the phases of signals $s_1$ and $s_2$. If such is not the case, a correction voltage appears at the comparator output, and will bring back oscillator OL3 to its correct phase. The reference signal of phase 0 has thus been created.

Mixer $M_{23}$ delivers a signal whose frequency is $f_{IM_{23}}=500$ kc./s., which is modulated at 50 c./s.$\vee +\varphi/2$ and is passed to amplifier $FI_{23}$. The latter is coupled to a synchronous detector whose further input is fed by the reference signal from local oscillator OL3.

Detector DC puts out a signal at 50 mc./s.$+\varphi/2$ carrying the phase information, which is passed to filter F, followed by a frequency doubler DF, which delivers a signal at 100 c./s. with a phase $+\varphi$.

It is to be noticed that the described system is particularly suited to be adapted to a receiver having two antennas and incorporating the channels, ending at amplifier $FI_{23}$.

The system of the invention provides a linear detection of signal envelope at 500 kc./s. and thus avoids the "contamination" of the signal by noise. Briefly, the operation comes down to elaborating a local signal having the same frequency as signals $s_1$ and $s_2$, and whose phase is equal to the mean value of the respective phases of their signals.

Figure 5:
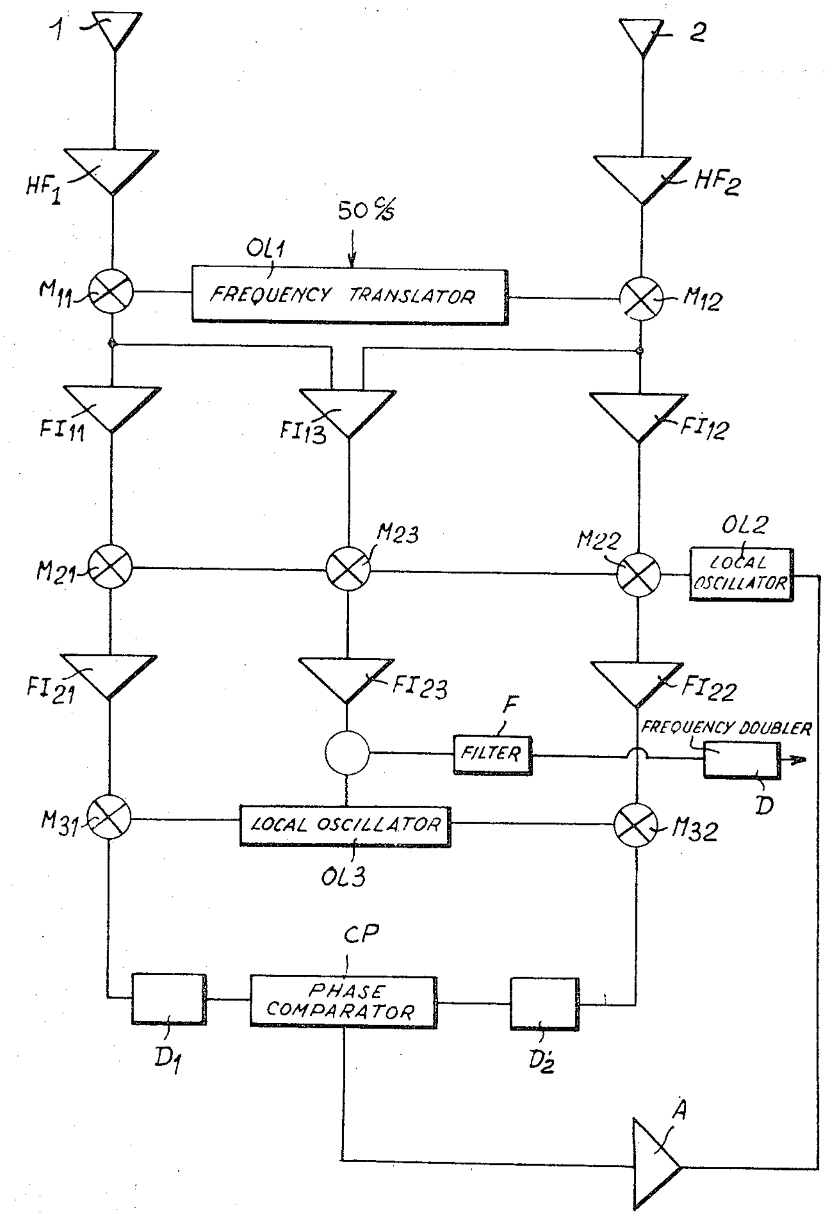
FIG. 5 is a further embodiment of the invention.

FIG. 5 shows another embodiment of the invention. The same reference numbers are used to designate the same components in FIGS. 5 and 2.

The difference between the system of FIGS. 2 and 5 consists in that in the latter one of the local oscillators, i.e. oscillator OL2, is incorporated in the phase control loop.

It results that signals amplified by the intermediate frequency amplifiers, following said oscillator are brought back to the center of the band, the phase regulation compensating for the phase shift due to the Doppler effect. This makes it possible to use amplifiers with a narrower pass band.

In the embodiment considered, oscillator OL3 has a fixed frequency of 500 kc./s. This frequency stabilization can be achieved by means of a quartz. Phase comparator CP controls the phase of the 9500 kc./s. oscillator OL2, through an amplifier A.

Figure 4:
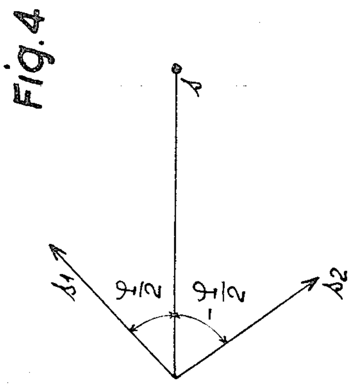

It results that unit $FI_{21}$, $FI_{22}$ and so on furnishes a complex signal configuration as shown in FIG. 4, the phase control consisting in causing signals $s_1$ and $s_2$ to rotate together to obtain the desired phase $s$.

Of course, the invention is not limited to the embodiments shown and described which were given solely by way of example.

What is claimed is:

1. A radio interferometer for determining the direction of a source transmitting a signal comprising: two antennas for picking up said signal, with a first and a second phase respectively, local means for generating a local signal, and means for locking the phase of said local signal to a phase value which is the average of said first and second phases, further local means for generating, from said signals as picked up by said antennas, a further signal having the frequency of said local signal and a phase equal to the difference between said average and one of said first and second phases; and phase comparing means, having two inputs for receiving respectively said local and said further signal, and an output.

2. A radio interferometer comprising: a first and a second aerial for collecting the signal from a remote source for measuring the phase shift $\varphi$ between said signal as respectively collected by said first and said second aerial; a first and a second chain, identical to each other, respectively connected to said first and second aerials, said first and second chains comprising respectively in series a plurality of mixers and amplifier stages and a first and second output, respectively; frequency translating means connected to said mixers of said first and said second chains for deriving from said signal, as respectively picked up by said aerials, a first and a second wave of the same low frequency having respective phase shifts $$+\frac{\varphi}{2} \text{ and} -\frac{\varphi}{2}$$

with respect to a reference phase; phase comparing means respectively connected to said first and second outputs and having an output delivering a control signal when said respective phase shifts deviate from $$+\frac{\varphi}{2} \text{ and} -\frac{\varphi}{2}$$

respectively; a third chain having two inputs respectively connected to said first and said second chains, and comprising a plurality of series connected mixer and amplifier stages, for producing a third intermediate frequency modulated by said low frequency phase signal shifted by $\varphi/2$ with respect to said reference phase; an oscillator phase locked to said reference phase by said phase comparing means; and a synchronous detector, connected to said third chain and to said oscillator, and having an output for producing an output voltage proportional to $\varphi/2$.

3. A radio interferometer comprising: a first and a second aerial for collecting the signal from a remote source for measuring the phase shift $\varphi$ between said signal as respectively connected by said first and said second aerial; a first and a second chain, respectively connected to said first and said second antenna, and a third chain, each of said first and said second chains comprising in series a first mixer, a first intermediate frequency amplifier, a second mixer, a second intermediate frequency amplifier, and a third mixer; a frequency translator connected to said first mixers for generating and feeding to said first amplifiers, a first and a second wave, whose respective frequencies are the sum and the difference of the frequencies of an intermediate frequency wave and of a low frequency wave, respectively phase shifted with respect to a reference phase by $$+\frac{\varphi}{2} \text{ and} -\frac{\varphi}{2}$$

said third chain comprising in series a mixer amplifier, a fourth mixer, and a third amplifier; said mixer amplifier receiving said first and said second waves and delivering a third intermediate frequency wave modulated at said low frequency with a $\varphi/2$ phase shift, with respect to said reference phase; a local oscillator connected to said second mixers of said first and said second chains and to said fourth mixer for feeding to said second amplifiers of said first and second chains and said third amplifier respectively fourth, fifth and sixth waves, respectively frequency transposed from said first, second and third waves; a second local oscillator, having an output connected to said third mixers of said first and said second chains; a phase comparator and two phase shifters respectively connected to said third mixers of said first and said second chain and having respective phase shifts; a synchronous detector having two inputs respectively connected to the output of said second local oscillator and to said third amplifier and having an output; said phase comparator having an output for controlling one of said first and said second local oscillator.

4. A system according to claim 3 wherein said phase comparator controls said first local oscillator.

5. A system according to claim 3, wherein said phase comparator controls said second local oscillator.

References Cited

UNITED STATES PATENTS

| | | | |
|---|---|---|---|
| 2,484,824 | 10/1949 | Hansel | 343—113 |
| 2,955,199 | 10/1960 | Mindes | 343—117 X |
| 2,975,275 | 3/1961 | Adans. | |

OTHER REFERENCES

Mengel: Tracking the Earth Satellite and Data Transmission by Radio, In Proceedings of the IRE, June 1956, TK7800I7, pp. 755–760 relied on.

RODNEY D. BENNETT, *Primary Examiner.*

CHESTER L. JUSTUS, *Examiner.*

D. C. KAUFMAN, *Assistant Examiner.*